(12) United States Patent
Nishio (10) Patent No.: US 8,467,662 B2
(45) Date of Patent: Jun. 18, 2013

(54) PLAYBACK TERMINAL, TIME-OF-DAY MANAGEMENT METHOD, AND CONTENT PLAYBACK SYSTEM

(75) Inventor: Kazutaka Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 12/739,857

(22) PCT Filed: Nov. 27, 2009

(86) PCT No.: PCT/JP2009/006418
§ 371 (c)(1),
(2), (4) Date: Apr. 26, 2010

(87) PCT Pub. No.: WO2010/064393
PCT Pub. Date: Jun. 10, 2010

(65) Prior Publication Data
US 2011/0222834 A1    Sep. 15, 2011

(30) Foreign Application Priority Data
Dec. 2, 2008  (JP) ................................. 2008-307170

(51) Int. Cl.
*H04N 9/80*    (2006.01)
(52) U.S. Cl.
USPC ....................................................... 386/248
(58) Field of Classification Search
USPC ............. 386/248, 291, 326; 705/59; 713/501; 714/701; 726/26
See application file for complete search history.

(56) References Cited

U.S. PATENT DOCUMENTS 6,920,567 B1 * 7/2005 Doherty et al. ................. 726/22
7,134,144 B2 * 11/2006 McKune ......................... 726/26
(Continued)

FOREIGN PATENT DOCUMENTS

EP    2169956 A1 *  3/2010
JP    2-83732          3/1990
(Continued)

OTHER PUBLICATIONS

International Search Report issued Dec. 28, 2009 in corresponding International Application No. PCT/JP2009/006418.

(Continued)

*Primary Examiner* — Thai Tran
*Assistant Examiner* — Stephen Smith
(74) *Attorney, Agent, or Firm* — Wenderoth, Lind & Ponack, L.L.P.

(57) ABSTRACT

A playback terminal (10) prevents a problem that content cannot be viewed because of a time adjustment carelessly made to a clock by a user. The playback terminal (10) receives content and usage expiration information of the content from a content server (20) and plays back the content, the playback terminal including: a content storage unit (14) which stores the content; a content expiration information storage unit (15) which stores the usage expiration information; a clock unit (16) which manages time-of-day information; a clock setting instruction unit (12) which receives an entry of a time of day to be set to the clock unit (16); and a control unit (11) which rejects the entry from the clock setting instruction unit (12) or performs control so that the time-of-day information of the clock unit (16) is not updated to the time of day entered from the clock setting instruction unit (12), while the usage expiration information corresponding to the content stored in the content storage unit (14) is stored in the content expiration information storage unit (15).

9 Claims, 9 Drawing Sheets

U.S. PATENT DOCUMENTS

| | | | |
|---|---|---|---|
| 2002/0019814 A1* | 2/2002 | Ganesan | 705/59 |
| 2003/0004888 A1* | 1/2003 | Kambayashi et al. | 705/59 |
| 2004/0015519 A1 | 1/2004 | Maeda | |
| 2004/0236788 A1 | 11/2004 | Sato et al. | |
| 2005/0204209 A1* | 9/2005 | Vataja | 714/701 |
| 2006/0005261 A1 | 1/2006 | Sukigara et al. | |
| 2006/0179360 A1* | 8/2006 | Nakamura et al. | 714/47 |
| 2007/0098165 A1 | 5/2007 | Yoshikawa | |
| 2008/0127279 A1 | 5/2008 | Futa et al. | |
| 2008/0175566 A1* | 7/2008 | Khedouri et al. | 386/124 |
| 2008/0300887 A1* | 12/2008 | Chen et al. | 705/1 |
| 2009/0119534 A1* | 5/2009 | Card, II | 713/501 |
| 2010/0135638 A1* | 6/2010 | Mio | 386/83 |

FOREIGN PATENT DOCUMENTS

| | | |
|---|---|---|
| JP | 2001-229229 | 8/2001 |
| JP | 2001-356966 | 12/2001 |
| JP | 2004-46554 | 2/2004 |
| JP | 2005-32234 | 2/2005 |
| JP | 2007-72533 | 3/2007 |

OTHER PUBLICATIONS

Informal Comments dated Feb. 26, 2010 in response to the Written Opinion of the International Searching Authority in corresponding International Application No. PCT/JP2009/006418, with English translation.

* cited by examiner

| Content identifier | Content title | Category | Content expiration information |
|---|---|---|---|
| 1 | abc-song | Music | Time-of-day management type<br>Start time:2009/01/01、0:00<br>End time:Not set |
| 2 | fantasy-movie | Video | Period management type<br>3 days after playback is started |
| 3 | fly-movie | Video | Time-of-day management type<br>Start time:2009/04/01、9:00:00<br>End time:2009/04/30、17:00:00 |
| 4 | dsc-image | Still image | Not set |
| 5 | trip-movie | Video | Not set |

PLAYBACK TERMINAL, TIME-OF-DAY MANAGEMENT METHOD, AND CONTENT PLAYBACK SYSTEM

TECHNICAL FIELD

The present invention relates to a playback terminal and the like that plays back content. In particular, the present invention relates to a playback terminal that plays back content having expiration information.

BACKGROUND ART

In recent years, portable playback appliances, to which content such as AV (audiovidual) content is loaded to be viewed outside home, have come into widespread use.

Figure 1:
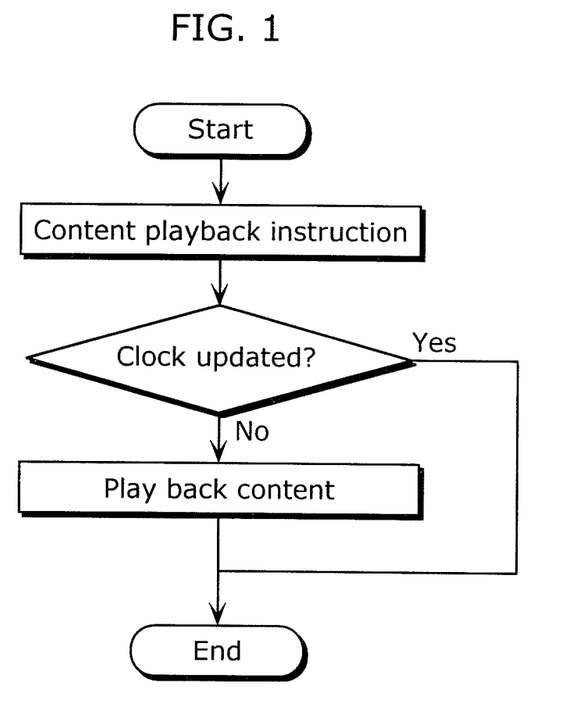
FIG. 1 is a process flow diagram of a conventional playback terminal.

There may be a case where AV content has a limited period of time during which can be viewed. In order to manage such AV content, usage expiration information and the AV content can be managed together. For example, Patent Literature 1 discloses what is shown in FIG. 1. When a date-and-time change operation is executed, date-and-time change information is stored. Then, when music content is to be played back, it is determined whether or not the date-and-time change information is present. When the date-and-time change information is determined to be stored, playback of the music content is limited. Thus, in the case where the date-and-time change operation has been executed, the music content cannot be played back.

CITATION LIST

Patent Literature

[PTL 1]
Japanese Unexamined Patent Application Publication No. 2007-72533

SUMMARY OF INVENTION

Technical Problem

With the above-mentioned usage expiration management method, there is an inconvenience that the content cannot be viewed in the case where a user carelessly adjusts a clock.

The present invention has an object to provide a playback terminal that enhances the convenience for the user by allowing the user to adjust a time of day of the playback terminal when the stored content has no usage expiration period, and that increases the protection of a right holder by prohibiting the setting of the clock when the content having the usage expiration period is stored.

Solution to Problem

In order to achieve the aforementioned object, the playback terminal according to an aspect of the present invention is a playback terminal which receives content and usage expiration information of the content from a content server and plays back the content, the playback terminal including: a content storage unit which stores the content; a content expiration information storage unit which stores the usage expiration information; a clock unit which manages time-of-day information; a clock setting instruction unit which receives an entry of a time of day to be set to the clock unit; and a control unit which rejects the entry from the clock setting instruction unit or performs control so that the time-of-day information of the clock unit is not updated to the time of day entered from the clock setting instruction unit, while the usage expiration information corresponding to the content stored in the content storage unit is stored in the content expiration information storage unit.

With this configuration, when the usage expiration information corresponding to the content is stored, the time of day of the playback terminal cannot be changed. Thus, the protection of the right holder can be increased. Meanwhile, when only the content that does not have the usage expiration information is stored, the time of day of the playback terminal can be changed. Accordingly, the convenience for the user can be enhanced.

Advantageous Effects of Invention

The playback terminal of the present invention limits the time-of-day setting only when content having the usage expiration information is stored, and allows the time-of-day setting when content with no specific usage expiration period is stored.

DESCRIPTION OF EMBODIMENTS

When the usage expiration information corresponding to the content stored in the playback terminal specifies a period of time during which the content can be played back, the playback terminal of the present invention performs control so as not to update the time of day of a clock included in the playback terminal even when receiving an instruction to update the time of day from the user via an interface of the playback terminal.

Figure 6:
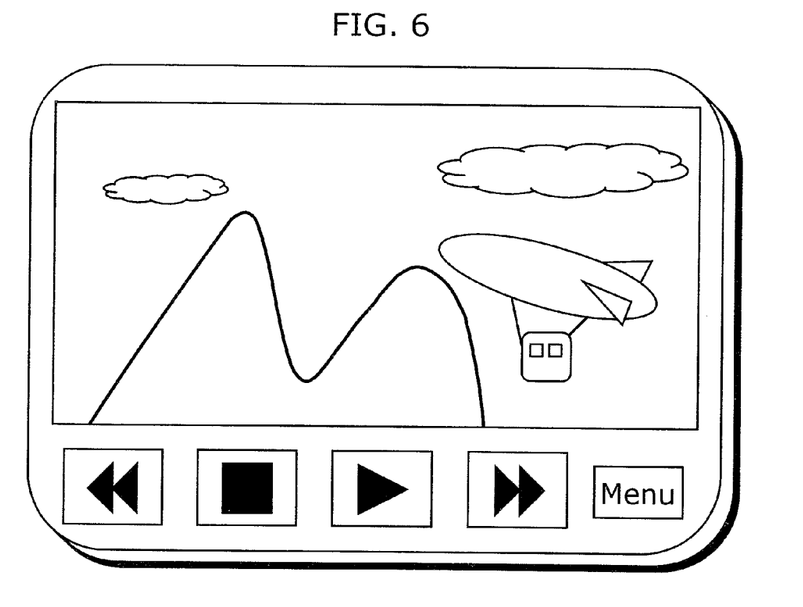
FIG. 6 is a schematic diagram of the playback terminal.

FIG. 6 is a schematic diagram of the playback terminal. The playback terminal shown in FIG. 6 includes: a screen for displaying content; and buttons and the like to operate content playback and functional settings of the playback terminal. This playback terminal is an example of a transportable appliance with which content can be viewed.

First Embodiment

Figure 2:
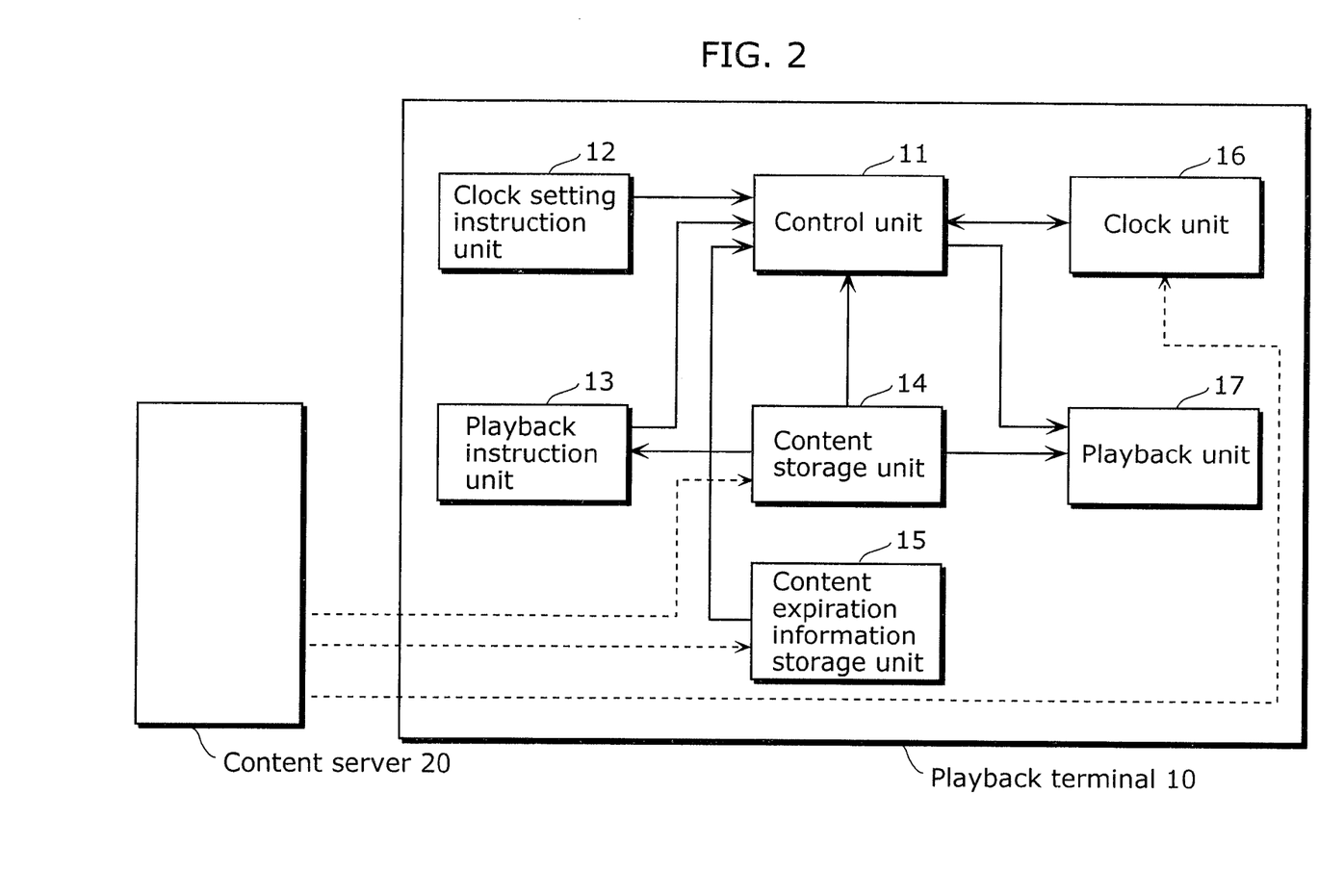
FIG. 2 is a diagram showing a configuration of a playback terminal according to a first embodiment.

FIG. 2 is a diagram showing a configuration of a playback terminal 10 according to the first embodiment.

In the first embodiment, the playback terminal 10 includes a control unit 11, a clock setting instruction unit 12, a playback instruction unit 13, a content storage unit 14, a content expiration information storage unit 15, a clock unit 16, and a playback unit 17.

The playback terminal 10 is connected to a content server 20 that is externally provided, via a network or the like, and obtains content from the content server 20. The playback terminal 10 also obtains information regarding the usage expiration period assigned to the content, as needed.

The clock unit 16 manages time-of-day information of the playback terminal 10. The clock unit 16 receives power from a battery or the like which is not shown, and counts a time of day of the playback terminal all the time.

The playback unit 17 receives an instruction from the control unit 11 and plays back the content. The content includes video and audio. Images included in video, such as moving images and still images, to be displayed on a screen are displayed on a display screen (not shown). The display screen displays images using an organic EL, an inorganic EL, an LED, or a liquid crystal display device. Audio, such as voice and music, is played back from a speaker, an external earphone terminal (not shown), or the like.

The content storage unit 14 stores content, such as video, music, and voice mentioned above. Video includes still images and moving images which are stored as data using coding techniques, such MPEG4, H.264, and other. For music and voice, although there are a variety of formats such as the MP3 audio format and the WAVE format, the format for the present invention is not particularly limited to these.

The usage of the aforementioned content is limited at a certain level and, in some cases, the content may be encrypted as necessary. Thus, when the content is to be played back, the content needs to be first decrypted using a decryption key determined for each piece of content. After the decryption, the content is played back. As a method for limiting the content usage, there is the digital rights management (DRM: Digital Rights Management) technology.

The content expiration information storage unit 15 stores usage expiration information which is information regarding the usage expiration period of content and the like. As the usage expiration information, there are a period management type and a time-of-day management type. The usage expiration information of period management type specifies a period of time during which the content can be played back. The period is counted from when the content is played back for the first time or from when the content is transferred. The usage expiration information of time-of-day management type specifies a beginning time of day (a start time) and a finishing time of day (an end time) of the period during which the content can be played back, or specifies either one of the times of day.

As an example, the usage expiration information of period management type specifies that the content can be played back during a designated period of time, such as three days or one week, after the content is played back for the first time, and that the content cannot be played back after the expiration of the designated period of time.

As an example, the usage expiration information of time-of-day management type specifies that the content can be played back only from 9:00 (9 o'clock) on April 1 to 17:00 (17 o'clock) on April 30, and that the content cannot be played back at any time of day before or after this period. In addition, the usage expiration information of time-of-day management type may designate only the time of day which is a playback start time or only the time of day which is a playback end time.

Figure 8:
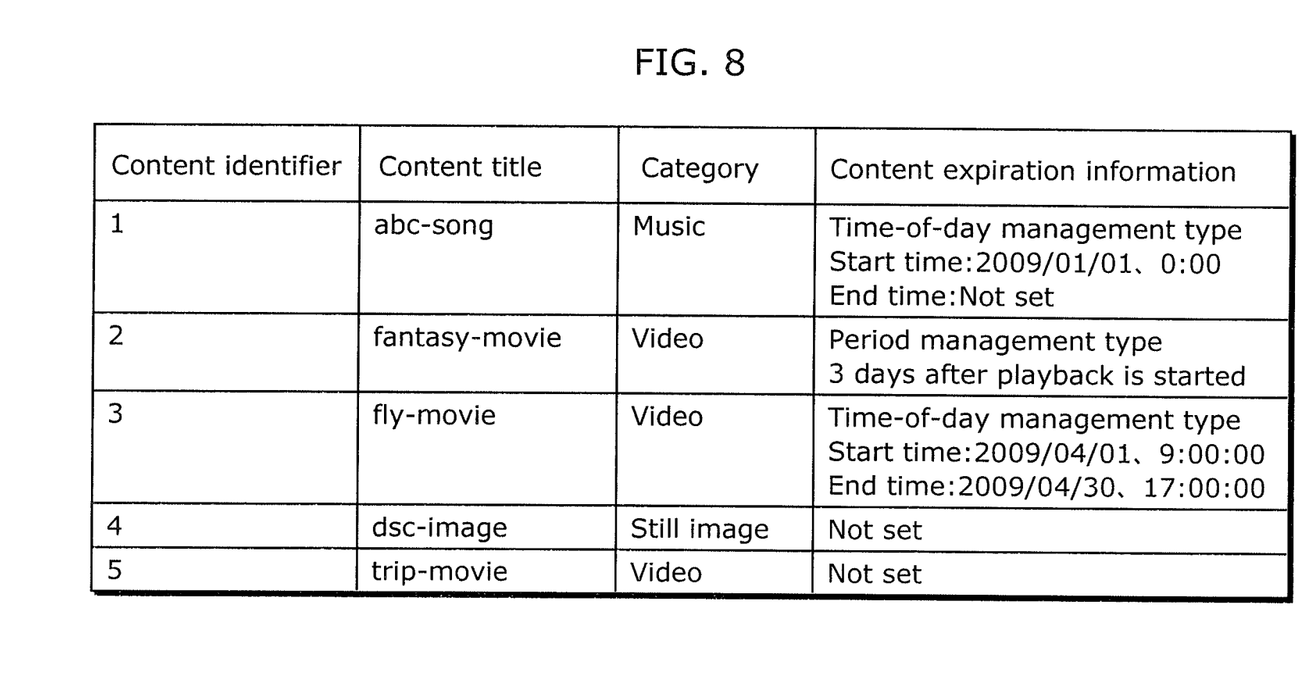
FIG. 8 is a table in which content and expiration information are managed.

FIG. 8 shows an example of content-related information including content and usage expiration information of the content. The content-related information includes a content identifier that uniquely identifies the content, a content title, a content category describing a category such as video, music, or a still image, and content expiration information.

FIG. 8 shows that: content represented by a content identifier "3" has a title of "fly-movie"; the category of the content is "Video"; the content expiration information of the content is of the time-of-day management type; and the start time of the viewable period is 9:00 sharp (9 o'clock 0 minutes 0 seconds) on Apr. 1, 2009 and the end time is 17:00 sharp (17 o'clock 0 minutes 0 seconds) on Apr. 30, 2009. Also, it is shown that: content represented by a content identifier "2" has a title of "fantasy-movie"; the category of the content is "Video"; the content expiration information of the content is of the period management type; and the viewable period is three days after the playback is started for the first time.

The playback terminal 10 is connected to the external content server 20 and obtains the content and the usage expiration information. When doing so, the playback terminal 10 receives time-of-day information from the content server 20, and updates the time of day of the clock unit 16.

The content server 20 does not necessarily need to be a server apparatus of a content providing company or a content sales company, and may be a recorder of the user for home use or a TV having a content accumulative function, for example. The content server 20 may be any apparatus as long as the apparatus is connected to the playback terminal 10 via any network that is connected to the playback terminal 10, and may be a server apparatus connected to the playback terminal 10 via a TV, a recorder, or a personal computer.

As described above, the content and the usage expiration information is obtained via the content server 20, and the time of day is updated also via the content server 20. However, these obtainment and updating may be performed by the control unit 11 of the playback terminal 10 or by another control unit which is not shown.

The clock setting instruction unit 12 is a unit used for entering a time of day to be set to the clock unit 16. For example, a current date, hours, and minutes and an adjustment screen may be displayed on a screen display unit (not shown) using a clock setting menu so that the user can directly enter the date, the hours, and the minutes. Also, on a regular basis or in accordance with an instruction from the user, the time of day may be synchronized with a time of day of an external server or an apparatus other than the content server 20 via a communication unit (not shown) or the like connected to a time-of-day server. The clock setting instruction unit 12 sends a clock setting instruction to the control unit 11, together with the desired time of day which is entered by the user for an update.

Figure 7:
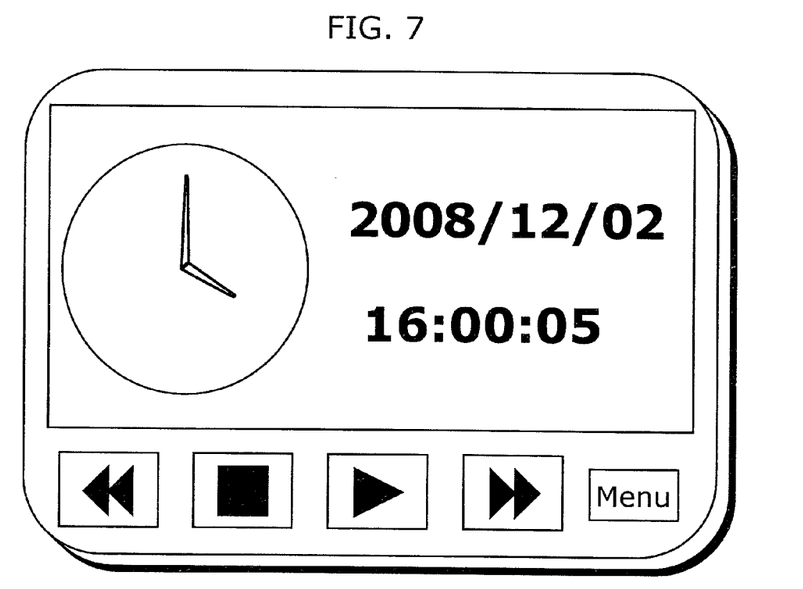
FIG. 7 is a diagram showing a time-of-day setting of the playback terminal.

FIG. 7 shows an example of a time-of-day setting screen displayed by the playback terminal 10. Through a menu operation or the like executed by the user, the clock setting menu of the playback terminal 10 is displayed. The playback terminal 10 shows the current time of day on the display screen, using a clock icon and a digital clock. Then, the user enters a desired time of day using buttons and the menu.

The playback instruction unit 13 receives an instruction from the user to play back content stored in the content storage unit 14. For example, a list of content stored in the content storage unit 14 may be displayed on the screen display unit (not shown) using icons, content titles, or the like so that the user selects a desired piece of content for playback. The playback instruction unit 13 sends a content playback instruction to the control unit 11, together with the selected content or information including the content identifier that identifies the content in the playback terminal 10.

The control unit 11 receives the time-of-day setting instruction from the clock setting instruction unit 12 and the content playback instruction from the playback instruction unit 13, and performs processing for each instruction.

When receiving the time-of-day setting instruction, the control unit 11 determines whether or not usage expiration information is stored in the content expiration information storage unit 15 corresponding for each piece of content stored in the content storage unit 14. When the usage expiration information of the content, out of these sets of usage expiration information, is of the period management type or of the time-of-day management type, the control unit 11 rejects the clock setting instruction from the clock setting instruction unit 12, and performs control in order for the time of day of the clock unit 16 not to be updated. In this case, the screen display unit (not shown) may display that the time of day cannot be changed. While the content stored in the content storage unit 14 does not have the usage expiration information, the control unit 11 receives the clock setting instruction from the clock setting instruction unit 12, and performs control in order for the time of day of the clock unit 16 to be updated in accordance with the instruction from the clock setting instruction unit 12.

When receiving the content playback instruction, the control unit 11 obtains the usage expiration information corresponding to the selected content from the content expiration information storage unit 15. Then, by comparing the time of day obtained from the clock unit 16 and the usage expiration information, the control unit 11 determines whether or not the current time of day is a time at which playback can be executed as specified by the usage expiration information. When playback can be executed at the current time of day, the control unit 11 notifies the playback unit 17 of the content selected through the playback instruction unit 13. Then, the playback unit 17 plays back this notified content.

Figure 3:
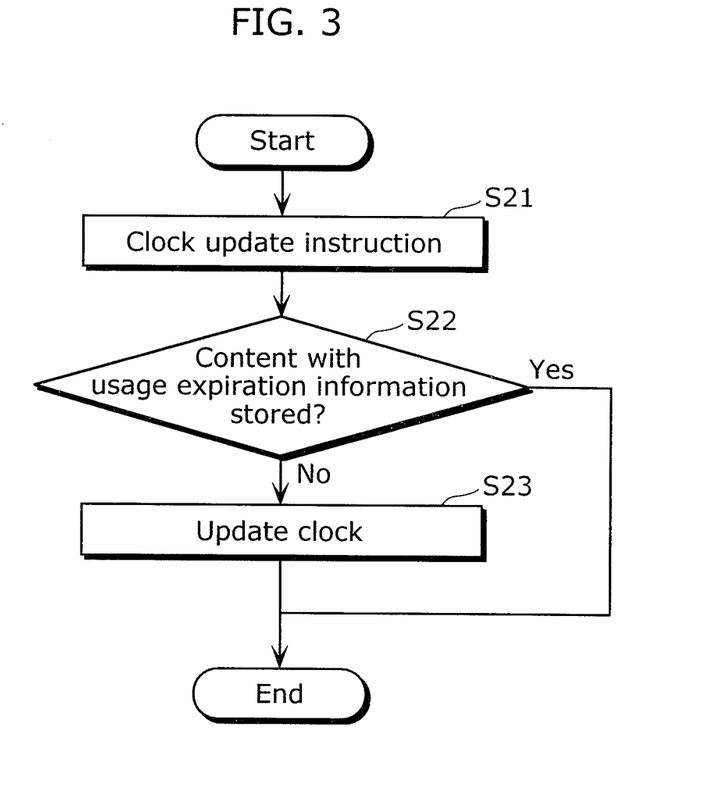
FIG. 3 is a process flow diagram of a control unit included in the playback terminal according to the first embodiment.

FIG. 3 shows a process flow of the above-described control unit 11.

The control unit 11 receives a time-of-day update instruction from the clock setting instruction unit 12 (S21).

Following this, the control unit 11 determines whether or not the usage expiration information is stored in the content expiration information storage unit 15 (S22).

When determining that the usage expiration information is not stored in the content expiration information storage unit 15 (No in S22), the control unit 11 changes the time of day of the clock unit 16 in accordance with the time-of-day update instruction received from the clock setting instruction unit 12 (S23).

When determining that the usage expiration information is stored in the content expiration information storage unit 15 (Yes in S22), the control unit 11 rejects the time-of-day update instruction from the clock setting instruction unit 12. Thus, the time of day of the clock unit 16 is not changed.

As described so far, the playback terminal 10 of the first embodiment limits the time-of-day setting only when content having the usage expiration information is stored, and allows the time-of-day setting when content with no specific usage expiration period is stored.

With this configuration, when the usage expiration information corresponding to the content is stored, the time of day of the playback terminal cannot be changed. Thus, the protection of the right holder can be increased. Meanwhile, when only the content having no usage expiration information is stored, the time of day of the playback terminal can be changed. Thus, the convenience for the user can be enhanced.

Second Embodiment

Here is another case other than the case described above in the first embodiment regarding the usage expiration information. Even when the usage expiration information of period management type or time-of-day management type is stored, the information may be considered as a mere formality and, in fact, playback can be executed indefinitely. In such a case, it can be considered that the usage expiration information does not exist. As an example of this case, although the usage expiration information of period management type is stored, the information is set such that the content can be played back indefinitely once the transfer of the content is started. As another example, although the usage expiration information of time-of-day management type is stored, the start time is set as a past time and the end time has yet to be set. Alternatively, even in the case where the usage expiration information is stored, the viewable period may not be set as a indefinite period but as a predetermined period which is an indefinite period in actuality (such as 100 years) or the end time may be set at an indefinite time of day (such as a time of day 100 years later after the start time). Such a practically indefinite period may be a period that should be minimally protected as defined by the product lifetime of the playback terminal 10 or by limitations imposed by various kinds of laws and regulations. Also, it should be obvious that, as the practically indefinite period, a predetermined period of time may be set.

Figure 4:
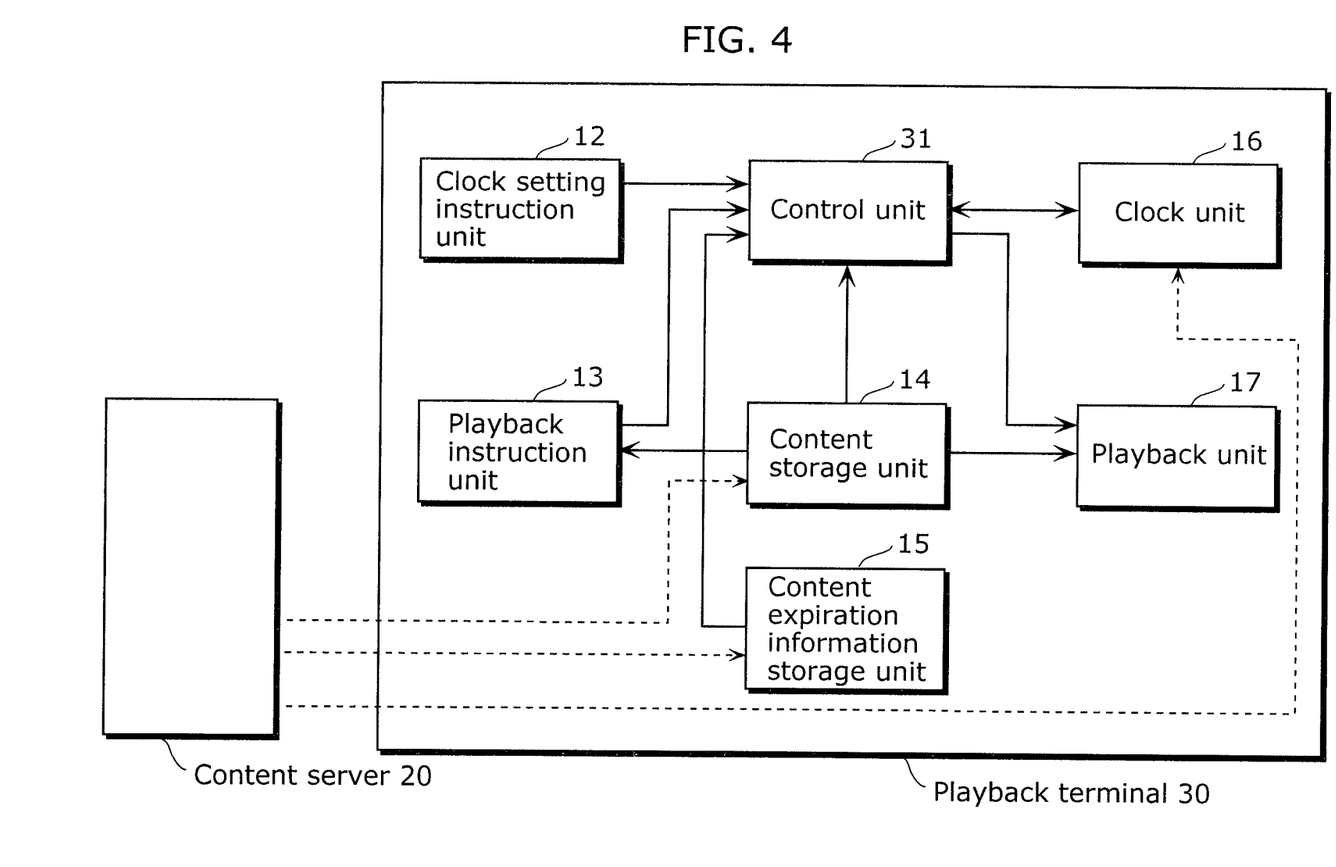
FIG. 4 is a diagram showing a configuration of a playback terminal according to a second embodiment.

FIG. 4 shows a configuration of a playback terminal 30 according to the second embodiment.

The configuration of the playback terminal 30 in the second embodiment is the same as that of the playback terminal 10 in the first embodiment except for an operation performed by a control unit 31. Therefore, the components other than the control unit 31 are assigned the same numerals as in the first embodiment.

The control unit 31 receives the time-of-day setting instruction from the clock setting instruction unit 12 and the content playback instruction from the playback instruction unit 13, and performs processing for each instruction.

When receiving the time-of-day setting instruction, the control unit 31 determines whether or not usage expiration information is stored in the content expiration information storage unit 15 corresponding for each piece of content stored in the content storage unit 14. When the usage expiration information of the content, out of these sets of usage expiration information, is of the period management type or of the time-of-day management type for playback and the usage expiration information is practically set, the control unit 31 rejects the clock setting instruction from the clock setting instruction unit 12 and performs control in order for the time of day of the clock unit 16 not to be updated.

Here, the control unit 31 may treat the content to which the usage expiration information is not practically assigned, as the content having no usage expiration information. A method for determining the content having no practical usage expiration information is explained as follows. When the usage expiration information is of the period management type, it is determined whether or not a viewable period longer than a predetermined period of time is set. When the usage expiration information is of the time-of-day management type, it is determined whether or not the end time is set at a future time of day more than a predetermined period of time away. As the predetermined period of time, ten years or so which is longer than the product lifetime may be set. Or, in the case of an electronic device with frequent model update, two to three years may be set as the predetermined period of time. Moreover, this predetermined period of time may be an update period or a validity period of the digital rights management provided as software or a system, or may be a specification development period related to these regulations. Furthermore, a period of time longer than a period during which the protection is allowed by laws and regulations concerning copyright may be used as the predetermined period of time.

When the content does not have the usage expiration information or when the content can be treated as the content having no usage expiration information, the control unit 31 receives the clock setting instruction from the clock setting instruction unit 12, and performs control in order for the time of day of the clock unit 16 to be updated in accordance with the instruction from the clock setting instruction unit 12.

When receiving the content playback instruction, the control unit 31 obtains the usage expiration information corresponding to the selected content from the content expiration information storage unit 15. Then, by comparing the time of day obtained from the clock unit 16 and the usage expiration information, the control unit 31 determines whether or not the current time of day is a time at which playback can be executed as specified by the usage expiration information. When playback can be executed at the current time of day, the control unit 31 notifies the playback unit 17 of the content selected through the playback instruction unit 13. Then, the playback unit 17 plays back this notified content.

Figure 5:
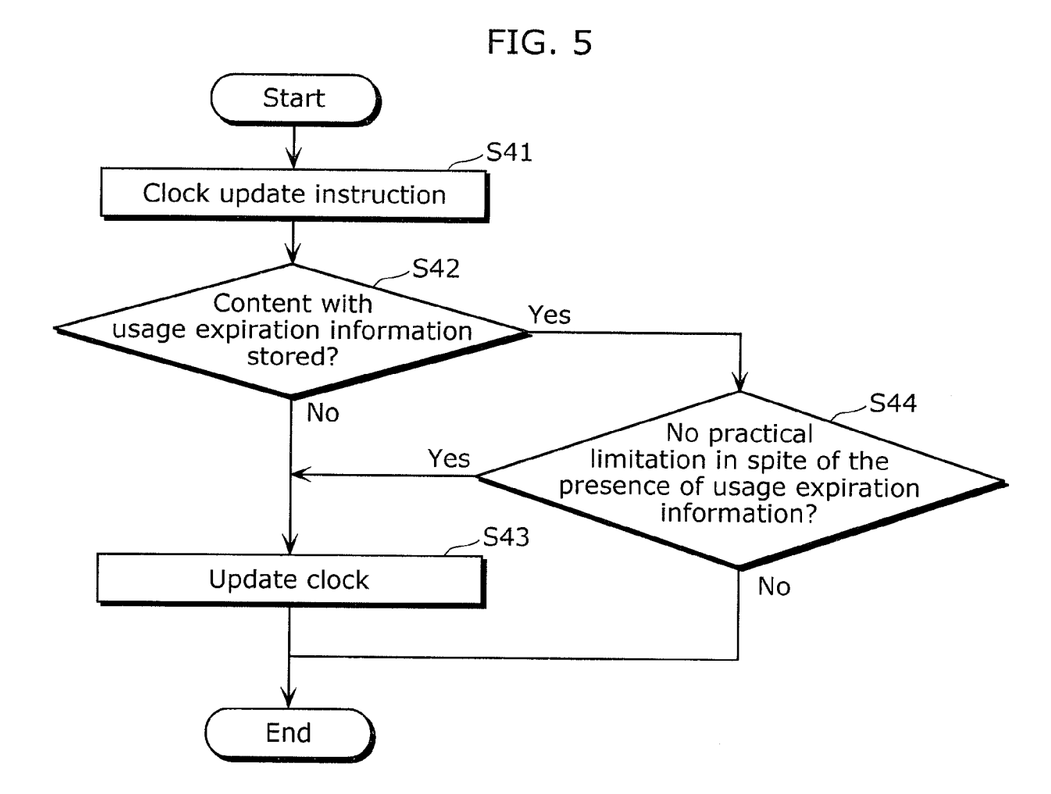
FIG. 5 is a process flow diagram of a control unit included in the playback terminal according to the second embodiment.

FIG. 5 shows a process flow of the control unit 31 according to the second embodiment.

The control unit 31 receives a time-of-day update instruction from the clock setting instruction unit 12 (S41).

Following this, the control unit 31 determines whether or not the usage expiration information is stored in the content expiration information storage unit 15 (S42).

When determining that the usage expiration information is not stored in the content expiration information storage unit 15 (No in S42), the control unit 31 changes the time of day of the clock unit 16 in accordance with the time-of-day update instruction received from the clock setting instruction unit 12 (S43).

When determining that the usage expiration information is stored in the content expiration information storage unit 15 (Yes in S42), the control unit 31 analyzes the details of the usage expiration information.

When it is determined, as a result of analyzing the details of the usage expiration information, that playback can be executed indefinitely in actuality and thus no practical limitation is imposed (Yes in S44), the control unit 31 proceeds to S43 and changes the time of the clock unit 16.

When it is determined, as a result of analyzing the details of the usage expiration information, that the usage limitation is practically imposed (No in S44), the control unit 31 rejects the time-of-day update instruction from the clock setting instruction unit 12. Thus, the time of day of the clock unit 16 is not changed.

As described so far, according to the playback terminal 30 in the second embodiment, even when the content having the usage expiration information is stored, the time-of-day setting is allowed in the case where the content whose viewable period is not practically limited is stored.

With this configuration, when the usage expiration information corresponding to the content is stored, the time of day of the playback terminal cannot be changed. Thus, the protection of the right holder can be increased. Meanwhile, when only the content having no usage expiration information or the content whose usage expiration information is not practically set is stored, the time of day of the playback terminal can be changed. Thus, the convenience for the user can be enhanced.

Third Embodiment

There is a case where, depending on a relation between the set details of the usage expiration information and the details of time-of-day setting to be executed by the user, the time-of-day setting is allowed and the content playback is authorized even when the content has the usage expiration information.

As an example, there is a case where the viewable period set in the usage expiration information is sufficiently long and the time to be updated by the user causes a minor difference.

Figure 9:
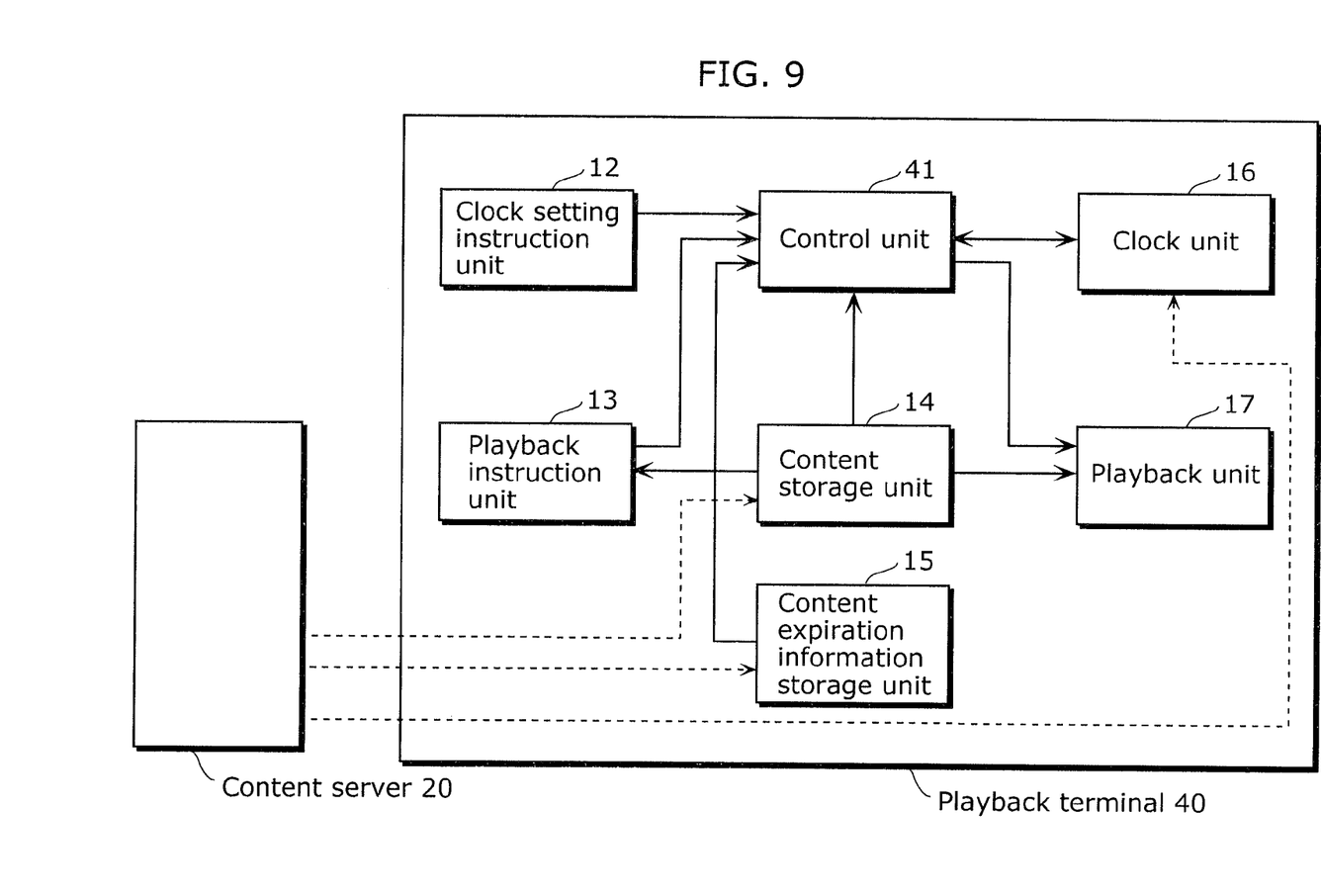
FIG. 9 is a diagram showing a configuration of a playback terminal according to a third embodiment.

A playback terminal 40 according to the third embodiment has almost the same configuration as in the first and second embodiments. Although an operation performed by a control unit 41 is different, the rest is the same as in the above first and second embodiments.

Figure 10:
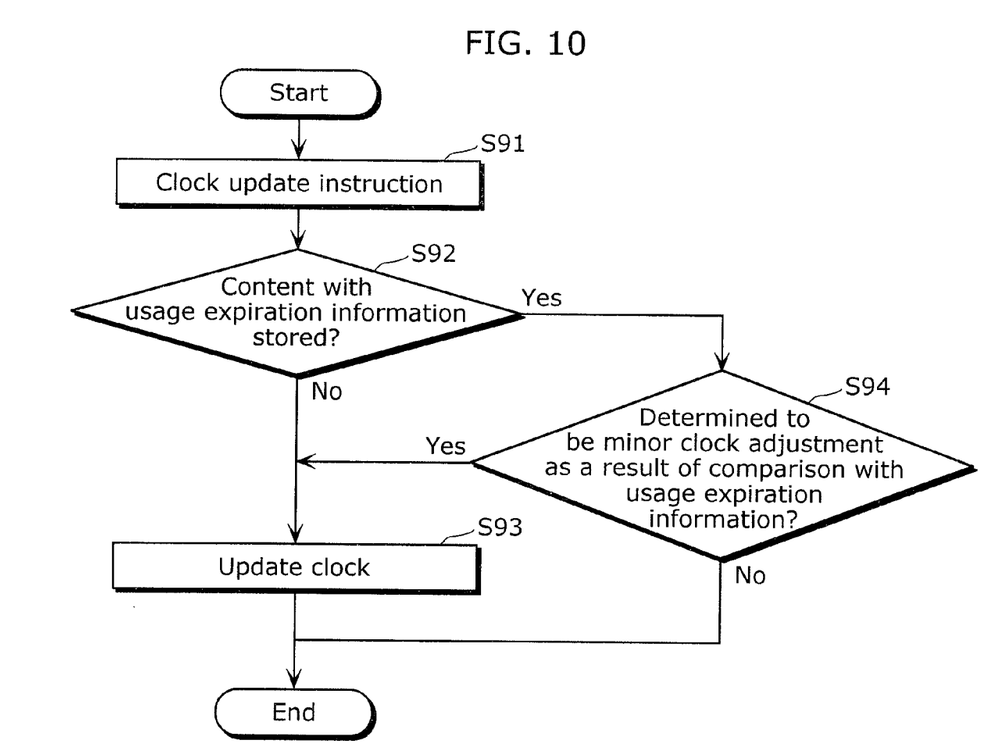
FIG. 10 is a process flow diagram of a control unit included in the playback terminal according to the third embodiment.

The following is an explanation of the operation performed by the control unit 41 in the third embodiment, with reference to FIGS. 9 and 10. In FIG. 9, the operation of the control unit 41 is different from the operations respectively performed by the control unit 11 and the control unit 31 in the first and second embodiments. The operation flow of the control unit 41 is shown in FIG. 10.

The control unit 41 receives a time-of-day update instruction from the clock setting instruction unit 12 (S91).

Following this, the control unit 41 determines whether or not the usage expiration information is stored in the content expiration information storage unit 15 (S92).

When determining that the usage expiration information is not stored in the content expiration information storage unit 15 (No in S92), the control unit 41 changes the time of day of the clock unit 16 in accordance with the time-of-day update instruction received from the clock setting instruction unit 12 (S93).

When determining that the usage expiration information is stored in the content expiration information storage unit 15 (Yes in S92), the control unit 41 analyzes the details of the usage expiration information.

When determining, as a result of analyzing the details of the usage expiration information, that there is only a minor difference between the desired time of day received from the clock setting instruction unit 12 and the current time of day held by the clock unit 16 (Yes in S94), the control unit 41 proceeds to S93 and changes the time of the clock unit 16. Here, an explanation is given as to the case where it is determined, as a result of analyzing the details of the usage expiration information, that there is only a minor difference between the desired time of day received from the clock setting instruction unit 12 and the current time of day held by the clock unit 16. That is, this is the case where the difference between the current time of day held by the clock unit 16 and the desired time of day received from the clock setting instruction unit 12 is adequately small with respect to a difference between the end time set in the usage expiration information and the current time of day. Whether or not the difference is adequately small can be determined through making a comparison with a predetermined period of time.

For example, suppose that: the end time set in the usage expiration information is 23:59:59 on Mar. 31, 2012; the current time of day is 12:00:00 on Dec. 1, 2008; and the desired time of day received from the clock setting instruction unit 12 is 13:00:00 on Dec. 1, 2008. In this case, a difference between the current time of day and the end time (that is, the remaining viewable period) is three years and three months. Moreover, a difference between the current time of day and the desired time of day is one hour. With respect to this one hour, the remaining viewable period is sufficiently long. From this, it can be determined that the time update may be authorized.

Meanwhile, in the case where the remaining viewable period is one hour and the difference between the current time of day and the desired time of day is one minute, it may not be determined that the difference is adequately small. For such a case, it might be better to add a condition that the remaining viewable period needs to be at least one day, for example.

With this being the situation, the following are conditions to determine whether or not the difference between the current time of day held by the clock unit 16 and the desired time of day received from the clock setting instruction unit 12 is adequately small.

A first condition is that a ratio between: a difference between the end time set in the usage expiration information and the current time of day (that is, the remaining viewable period); and the difference between the current time of day and the desired time of day, needs to be smaller than a predetermined ratio. The predetermined ratio may be 10:1 or 100:1, for example. When the remaining viewable period of the content is a few days, the difference between the current time of day and the desired time of day may need to be a few minutes, that is to say, the predetermined ratio may be 1440:1. Moreover, when the remaining viewable period of the content is a few years, the difference between the current time of day and the desired time of day may need to be a few days, that is to say, the predetermined ratio may be 365:1. In this way, the predetermined ratio may be differently set depending on the remaining viewable period such that the longer the remaining viewable period, the closer the ratio is to 1:1.

A second condition is that the remaining viewable period needs to be a predetermined period of time or longer, and that the ratio between the remaining viewable period and the difference between the current time of day and the desired time of day needs to be at least a predetermined ratio. For example, the predetermined remaining viewable period may be set at one month or so and the predetermined difference between the current time of day and the desired time of day may be set at one hour or so (that is to say, the ratio with the remaining viewable period is 720:1). In the case where one week or so is set as the viewable period, half of the viewable period may need to be remained. Moreover, in the case where a few years or so is set as the viewable period, at least a few months may need to be remained. Thus, the predetermined remaining viewable period may be determined depending on the viewable period of the content.

Furthermore, another determination condition that the difference between the current time of day and the desired time of day is within a predetermined period of time may be added. Here, the predetermined period of time may be set within one hour, for example. A period of time obtained by accumulating daily clock error for about one month or a few months at the maximum may be set as the predetermined period of time. For example, when the daily clock error is one minute, the predetermined period of time is about three hours in six months.

Accordingly, as described above, the determination standard can be created by freely combining: that the remaining viewable period is sufficiently long with respect to the difference between the current time of day and the desired time of day; that at least a predetermined viewable period is remained; and that the difference between the current time of day and the desired time of day is within a predetermined period of time.

After this, it is determined, as a result of analyzing the details of the usage expiration information, that the difference between the desired time of day received from the clock setting instruction unit 12 and the current time of day held by the clock unit 16 is not minor by comparison (No in S94), the control unit 41 rejects the time update instruction from the clock setting instruction unit 12. Thus, the time of day of the clock unit 16 is not changed.

As described so far, according to the playback terminal 40 in the third embodiment, even when the content having the usage expiration information is stored, the time-of-day setting is allowed in the case where the content whose viewable period is not practically limited is stored.

With the configuration as described, by applying the aforementioned determination standard to the content stored in the playback terminal 40, the user may not be allowed to update the time of day of the playback terminal 40 in some cases. Meanwhile, when it is determined, by comparison or in combination with the viewable period of the content, that the time duration to be changed is so minor, like a daily clock error, the user is allowed to update the time of day. Accordingly, the user can update the time of day of the playback terminal 40 more easily, and the convenience of playing back the content can be maintained at the same time.

INDUSTRIAL APPLICABILITY

Since the playback terminal of the present invention determines whether or not to allow the user to set the built-in clock depending on the usage expiration information of the stored content, the present invention is useful as a playback terminal or the like that carries content and has a clock function.

REFERENCE SIGNS LIST

10 Playback terminal
11 Control unit
12 Clock setting instruction unit
13 Playback instruction unit
14 Content storage unit
15 Content expiration information storage unit
16 Clock unit
17 Playback unit
20 Content server
30 Playback terminal
31 Control unit
40 Playback terminal
41 Control unit

The invention claimed is:

1. A playback terminal which receives content from a content server and plays back the content, said playback terminal further receives usage expiration information corresponding to the content if the content has the usage expiration information, said playback terminal comprising:
a content storage unit configured to store the content;
a content expiration information storage unit configured to store the usage expiration information corresponding to the content if the content has the usage expiration information;
a clock unit configured to manage time-of-day information;
a clock setting instruction unit configured to receive an entry of a time of day to be set to said clock unit; and
a control unit configured to (i) determine whether or not the usage expiration information corresponding to the content is stored in said content expiration information storage unit, and (ii) reject the entry from said clock setting instruction unit or to perform control not to update the time-of-day information of said clock unit to the time of day entered from said clock setting instruction unit when it is determined that the usage expiration information corresponding to the content is stored in said content expiration information storage unit.

2. A playback terminal which receives content from a content server and plays back the content, said playback terminal further receives usage expiration information corresponding to the content if the content has usage expiration information, said playback terminal comprising:
   a content storage unit configured to store the content;
   a content expiration information storage unit configured to store the usage expiration information corresponding to the content if the content has the usage expiration information;
   a clock unit configured to manage time-of-day information;
   a clock setting instruction unit configured to receive an entry of a time of day to be set to said clock unit; and
   a control unit configured to (i) determine whether or not the usage expiration information corresponding to the content is stored in said content expiration information storage unit, and (ii) perform control to update the time-of-day information of said clock unit based on the time of day entered from said clock setting instruction unit, (1) when it is determined that the usage expiration information corresponding to the content is stored in said content expiration information storage unit, when the time of day entered from said clock setting instruction unit is included in between times of day specified in the usage expiration information corresponding to the content stored in said content expiration information storage unit, and when a difference between the entered time of day and a current time of day managed by said clock unit is within a predetermined range, or (2) when it is determined that the usage expiration information corresponding to the content is not stored in said content expiration information storage unit.

3. A time-of-day management method for a playback terminal, said time-of-day management method comprising:
   receiving (i) content from a content server and (ii) usage expiration information corresponding to the content if the content has the usage expiration information;
   storing (i) the content into a storage unit and (ii) the usage expiration information corresponding to the content into the storage unit if the content has the usage expiration information;
   managing time-of-day information;
   determining whether or not the usage expiration information corresponding to the content is stored in the storage unit; and
   rejecting a time-of-day setting instruction or performing control not to update the time-of-day information when said determining determines that the usage expiration information corresponding to the content is stored in the storage unit.

4. A time-of-day management method for a playback terminal, said time-of-day management method comprising:
   receiving (i) content from a content server and (ii) usage expiration information corresponding to the content from the content server if the content has the usage expiration information;
   storing (i) the content into a storage unit and (ii) storing the usage expiration information into the storage unit if the content has the usage expiration information;
   managing time-of-day information;
   determining whether or not the usage expiration information corresponding to the content is stored in the storage unit; and
   updating the time-of-day information based on an entered time of day designated by a clock setting instruction, (1) when said determining determines that the usage expiration information corresponding to the content is stored in the storage unit, when the entered time of day is included in between times of day specified in the usage expiration information corresponding to the content, and when a difference between the entered time of day and a current time of day is within a predetermined range, or (2) when said determining determines that the usage expiration information corresponding to the content is not stored in the storage unit.

5. A content playback system comprising a content server and a playback terminal,
   wherein said content server includes:
      a storage unit configured to store content and usage expiration information corresponding to the content if the content has the usage expiration information; and
      a sending unit configured to receive a request from said playback terminal and send (i) the content to said playback terminal and (ii) the usage expiration information corresponding to the content to said playback terminal if the content has the usage expiration information, and
   wherein said playback terminal includes:
      a receiving unit configured to receive (i) the content from the content server and (ii) the usage expiration information corresponding to the content from the content server if the content has the usage expiration information;
      a content storage unit configured to store the content;
      a content expiration information storage unit configured to store the usage expiration information corresponding to the content if the content has the usage expiration information;
      a clock unit configured to manage time-of-day information;
      a clock setting instruction unit configured to receive an entry of a time of day to be set to said clock unit; and
      a control unit configured to (i) determine whether or not the usage expiration corresponding to the content is stored in the content expiration information storage unit, and (ii) reject the entry from said clock setting instruction unit or to perform control not to update the time-of-day information of said clock unit to the time of day entered from said clock setting instruction unit when it is determined that the usage expiration information corresponding to the content is stored in said content expiration information storage unit.

6. A content playback system comprising a content server and a playback terminal,
   wherein said content server includes:
      a storage unit configured to store content and usage expiration information corresponding to the content if the content has the usage expiration information; and
      a sending unit configured to receive a request from said playback terminal and send (i) the content to said playback terminal and (ii) the usage expiration information corresponding to the content if the content has the usage expiration information, and wherein said playback terminal includes:
   a receiving unit configured to receive (i) the content from said content server and (ii) the usage expiration information corresponding to the content from the content server if the content has the usage expiration information;
   a content storage unit configured to store the content;

a content expiration information storage unit configured to store the usage expiration information corresponding to the content if the content has the usage expiration information;

a clock unit configured to manage time-of-day information;

a clock setting instruction unit configured to receive an entry of a time of day to be set to said clock unit; and a control unit configured to (i) determine whether or not the usage expiration information corresponding to the content is stored in said content expiration information storage unit and (ii) perform control to update the time-of-day information of said clock unit based on the time of day entered from said clock setting instruction unit, (1) when it is determined that the usage expiration information corresponding to the content is stored in said content expiration information storage unit, when the time of day entered from said clock setting instruction unit is included in between times of day specified in the usage expiration information corresponding to the content stored in said content expiration information storage unit, and when a difference between the entered time of day and a current time of day managed by said clock unit is within a predetermined range, or (2) when it is determined that the usage expiration information corresponding to the content is not stored in said content expiration information storage unit.

7. A playback terminal which receives content and usage expiration information of the content from a content server and plays back the content, said playback terminal comprising:

a content storage unit configured to store the content;

a content expiration information storage unit configured to store the usage expiration information, the usage expiration information specifying a usage expiration period of the content stored in said content storage unit;

a clock unit configured to manage time-of-day information;

a clock setting instruction unit configured to receive an entry of a time of day to be set to said clock unit;

a determination unit to determine whether or not the usage expiration information has a limited expiration time; and a control unit configured to:

(i) reject the entry from said clock setting instruction unit or to perform control not to update the time-of-day information of said clock unit to the time of day entered from said clock setting instruction unit when the usage expiration period specified by the usage expiration information corresponding to the content stored in said content storage unit is less than a predetermined period of time;

(ii) allow the entry from said clock setting instruction unit or to perform control to update the time-of-day information of said clock unit to the time of day entered from said clock setting instruction unit when the usage expiration period specified by the usage expiration information corresponding to the content stored in said content storage unit is greater than the predetermined period of time; and (iii) allow the entry from said clock setting instruction unit or to perform control to update the time-of-day information of said clock unit to the time of day entered from said clock setting instruction unit when said determination unit determines that the usage expiration information does not have a limited expiration time.

8. A time-of-day management method for a playback terminal, said time-of-day management method comprising:

receiving content and usage expiration information of the content from a content server;

storing the content and the usage expiration information into a storage unit, the usage expiration information specifying a usage expiration period of the content stored in the storage unit;

managing time-of-day information;

determining whether or not the usage expiration information has a limited expiration time;

rejecting a time-of-day setting instruction or performing control not to update the time-of-day information when the usage expiration period specified by the usage expiration information stored in the storage unit is less than a predetermined period of time;

allowing the time-of-day setting instruction or performing control to update the time-of-day information when the usage expiration period specified by the usage expiration information stored in the storage unit is greater than the predetermined period of time, and allowing the time-of-day setting instruction or performing control to update the time-of-day information when said determining determines that the usage expiration information does not have a limited expiration time.

9. A content playback system comprising a content server and a playback terminal, wherein said content server includes:

a storage unit configured to store content and usage expiration information related to the content; and a sending unit configured to receive a request from said playback terminal and send the content and the usage expiration information of the content to said playback terminal, and wherein said playback terminal includes:

a receiving unit configured to receive the content and the usage expiration information of the content from said content server;

a content storage unit configured to store the content;

a content expiration information storage unit configured to store the usage expiration information, the usage expiration information specifying a usage expiration period of the content stored in said content storage unit;

a clock unit configured to manage time-of-day information;

a clock setting instruction unit configured to receive an entry of a time of day to be set to said clock unit;

a determination unit to determine whether or not the usage expiration information has a limited expiration time; and a control unit configured to:

(i) reject the entry from said clock setting instruction unit or to perform control not to update the time-of-day information of said clock unit to the time of day entered from said clock setting instruction unit, when the usage expiration period specified by the usage expiration information corresponding to the content stored in said content storage unit is less than a predetermined period of time;

(ii) allow the entry from said clock setting instruction unit or to perform control to update the time-of-day information of said clock unit to the time of day entered from said clock setting instruction unit, when the usage expiration period specified by the usage expiration information corresponding to the content stored in said content storage unit is greater than the predetermined period of time; and (iii) allow the entry from said clock setting instruction unit or to perform control to update the time-of-day information of said clock unit to the time of day entered from said clock setting instruction unit when said determination unit determines that the usage expiration information does not have a limited expiration time.

* * * * *